US009654348B2

(12) United States Patent
Mihovilovic

(10) Patent No.: US 9,654,348 B2
(45) Date of Patent: May 16, 2017

(54) USER INTERFACE FOR MANAGING AND VIEWING SYNCHRONIZATION SETTINGS IN A SYNCHRONIZATION SYSTEM

(71) Applicant: Dropbox, Inc., San Francisco, CA (US)

(72) Inventor: Domingo A. Mihovilovic, Menlo Park, CA (US)

(73) Assignee: Dropbox, Inc., San Francisco, CA (US)

( * ) Notice: Subject to any disclaimer, the term of this patent is extended or adjusted under 35 U.S.C. 154(b) by 428 days.

(21) Appl. No.: 14/175,256

(22) Filed: Feb. 7, 2014

(65) Prior Publication Data

US 2014/0157131 A1    Jun. 5, 2014

Related U.S. Application Data

(63) Continuation of application No. 12/799,832, filed on May 3, 2010, now Pat. No. 8,650,498.

(60) Provisional application No. 61/215,396, filed on May 4, 2009.

(51) Int. Cl.
| | |
|---|---|
| *G06F 3/048* | (2013.01) |
| *H04L 12/24* | (2006.01) |
| *G06F 17/30* | (2006.01) |
| *G06F 3/0481* | (2013.01) |
| *G06F 3/0482* | (2013.01) |
| *G06F 3/0484* | (2013.01) |

(52) U.S. Cl.
CPC ............ *H04L 41/22* (2013.01); *G06F 3/0482* (2013.01); *G06F 3/04817* (2013.01); *G06F 3/04847* (2013.01); *G06F 17/30174* (2013.01)

(58) Field of Classification Search
CPC ...................... G06F 17/30578; G06Q 10/107
See application file for complete search history.

(56) References Cited

U.S. PATENT DOCUMENTS

| 8,321,374 B2 * | 11/2012 | Holt ................. G06F 17/30578 707/610 |
| 2007/0005707 A1 * | 1/2007 | Teodosiu ............ G06Q 10/107 709/206 |

* cited by examiner

*Primary Examiner* — Jeffrey A Gaffin
*Assistant Examiner* — Ayesha Huertas Torres
(74) *Attorney, Agent, or Firm* — Arent Fox LLP

(57) ABSTRACT

In a synchronization system, the present invention provides an improved user interface through which a user can view and manage settings associated with the user's account in the synchronization system. In the preferred embodiment, a column is displayed for each electronic device associated with the user's account in the synchronization system. In each column is a visual representation of items (e.g., folders) that are (1) backed up, remotely accessible and/or synchronized in the synchronization system and (2) located on the electronic device associated with such column. For each item that is synchronized across multiple devices, all the visual representations of such item in the columns are aligned across a single row in the interface. In the preferred embodiment, there is an arrow, or other visual indicator, between the visual representations of such items to indicate that the items are synchronized.

15 Claims, 12 Drawing Sheets

USER INTERFACE FOR MANAGING AND VIEWING SYNCHRONIZATION SETTINGS IN A SYNCHRONIZATION SYSTEM

RELATED APPLICATIONS

This application is a continuation of and claims the benefit of the priority date of co-pending U.S. patent application Ser. No. 12/799,832 filed on May 3, 2010 and titled "User Interface for Managing and Viewing Synchronization Settings in a Synchronization System, which claims the benefit of U.S. Provisional Application No. 61/215,396 filed on May 4, 2009 and titled "User Interface for Managing and Viewing Synchronization Settings in a Synchronization System." The contents of foregoing applications are incorporated by reference as if fully disclosed herein

BACKGROUND OF THE INVENTION

1. Field of the Invention

This invention relates generally to synchronization/back-up server systems, and, more specifically, to a user interface for managing and viewing synchronization settings in a synchronization system.

2. Description of the Background Art

Synchronization systems enable users to back up, remotely access, share, and/or synchronize files and data objects. Files and data objects can be backed up to a central synchronization server or other device, such as a Network Accessed Storage (NAS) device. Files and data objects can also be synchronized across multiple electronic devices, such as, for example, a user's work computer, home computer, and mobile phone. An example of a synchronization system that enables users to remotely access, share, back up and synchronize files is Sharpcast, Inc.'s SUGARSYNC system.

In known synchronization systems, there is a usually a client application on each electronic device on which files are accessed or synchronized by the synchronization system. Such client application provides a user interface through which user can configure back up, remote access, share, and synchronization settings for files/data objects located on the local device on which the client application resides. Known client applications provide a primarily textual description or listing of the settings for the user's account in the synchronization system. As the number of electronic devices associated with a user's account in the synchronization system increases, it can be difficult for a user to see and track all the synchronization settings when they are in text form. Consequently, there is a need for an improved user interface through which a user can view and manage settings in the synchronization system.

SUMMARY

The present invention provides an improved user interface through which a user can view and manage settings associated with the user's account in the synchronization system. In the preferred embodiment, the user interface has a column for each electronic device (e.g., computer, NAS, set-top box, mobile phone, digital picture frame, personal digital assistant (PDA), etc.) associated with the user's account in the synchronization system. Displayed within each column are visual representations of items on the corresponding device that have been added to the user's account. Item's "added" to a user's account are items which are backed up, remotely accessible, shared, or synchronized in the synchronization system.

For items in the user's account that are synchronized with each other across two or more electronic devices, all the visual representations of such items in the applicable columns are horizontally aligned in the interface. In the preferred embodiment, the user interface displays an arrow, line, or other visual indicator of synchronization, between two items synchronized with each other across devices.

Also, in the preferred embodiment, the user interface is horizontally divided into two sections—one for items that are synchronized across multiple devices and one for items that have been added to the user's account (for remote access, sharing, or back up purposes) but are not synchronized across multiple devices. In other words, in such embodiment, each column associated with an electronic device has two sections, one showing the items on that device that are synchronized across one or more other devices, and one showing items on that device that have been added to the user's account for remote access or back up.

In a further embodiment of the invention, the user interface enables the user to perform functions related to his account in the synchronization system. For example, the user can add an item to his account from a local device, remove an item on the local device from his account, and synchronize a remote item with an item on the local device.

Those skilled in the art will appreciate that instead of creating a column for each electronic device in the user interface, a row could be created for each electronic device, and synchronized items can be aligned along a vertical column in the user interface.

DETAILED DESCRIPTION OF THE PREFERRED EMBODIMENTS

Figure 1:
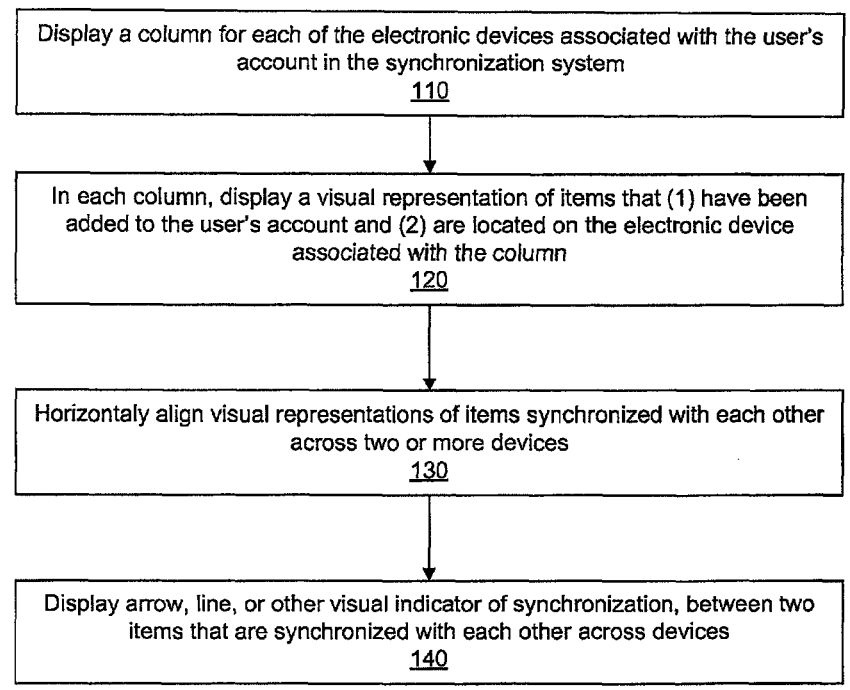
FIG. 1 is a flowchart that illustrates a method for displaying settings for a user's account in a synchronization system.

FIG. 1 illustrates a method for displaying settings for a user's account in a synchronization system. In one embodiment, the method is implemented by a client application that runs on an electronic device and that generates a user interface through which a user can select items on the electronic device for back up, remote access, sharing, or synchronization in the synchronization system (the "client UI application").

In generating the user interface, the client UI application displays a column for each of the electronic devices associated with the user's account in the synchronization system (step 110). In each column associated with an electronic device, the client UI application displays a visual representation of items on such electronic device that have been added to the user's account in the synchronization system (step 120). An item has been added to the user's account, when the user designates the items for back up, remote access, sharing, or synchronization using the synchronization system.

For items in the user's account that are synchronized with each other across two or more electronic devices, all the visual representations of such items in the applicable columns are horizontally aligned in the interface (step 130). In the preferred embodiment, the client UI application inserts an arrow, line, or other visual indicator of synchronization, between two items synchronized with each other across devices (step 140).

In an alternate embodiment, the client UI application displays a horizontal row, instead of a vertical column, for each of the electronic devices associated with the user's account in the synchronization system. In such embodiment, items that are synchronized across multiple user devices are aligned vertically (along a column) instead of horizontally.

"Items" as user herein can include any folder, file, directory, or data object on an electronic device. In the preferred embodiment, items are directory "folders" that can include documents, photos, music files, and video files. Electronic devices include, but are not limited to, computers, mobile phones, personal digital assistants (PDA), network-accessed storage devices, digital picture frames, televisions with storing and computing capability, and set-top boxes.

Figure 2:
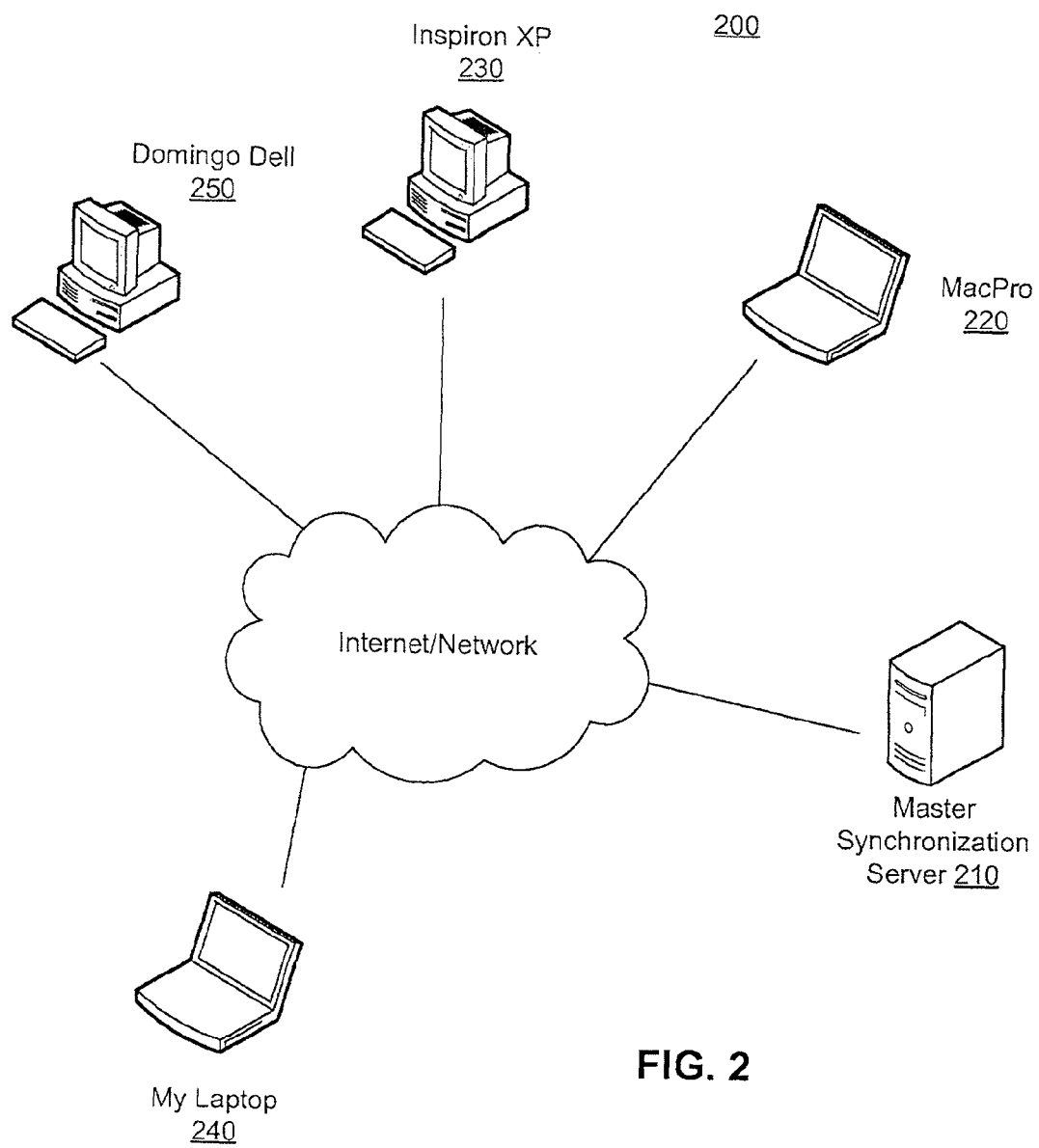
FIG. 2 illustrates the devices associated with a user's account in an example scenario.
Figure 3:
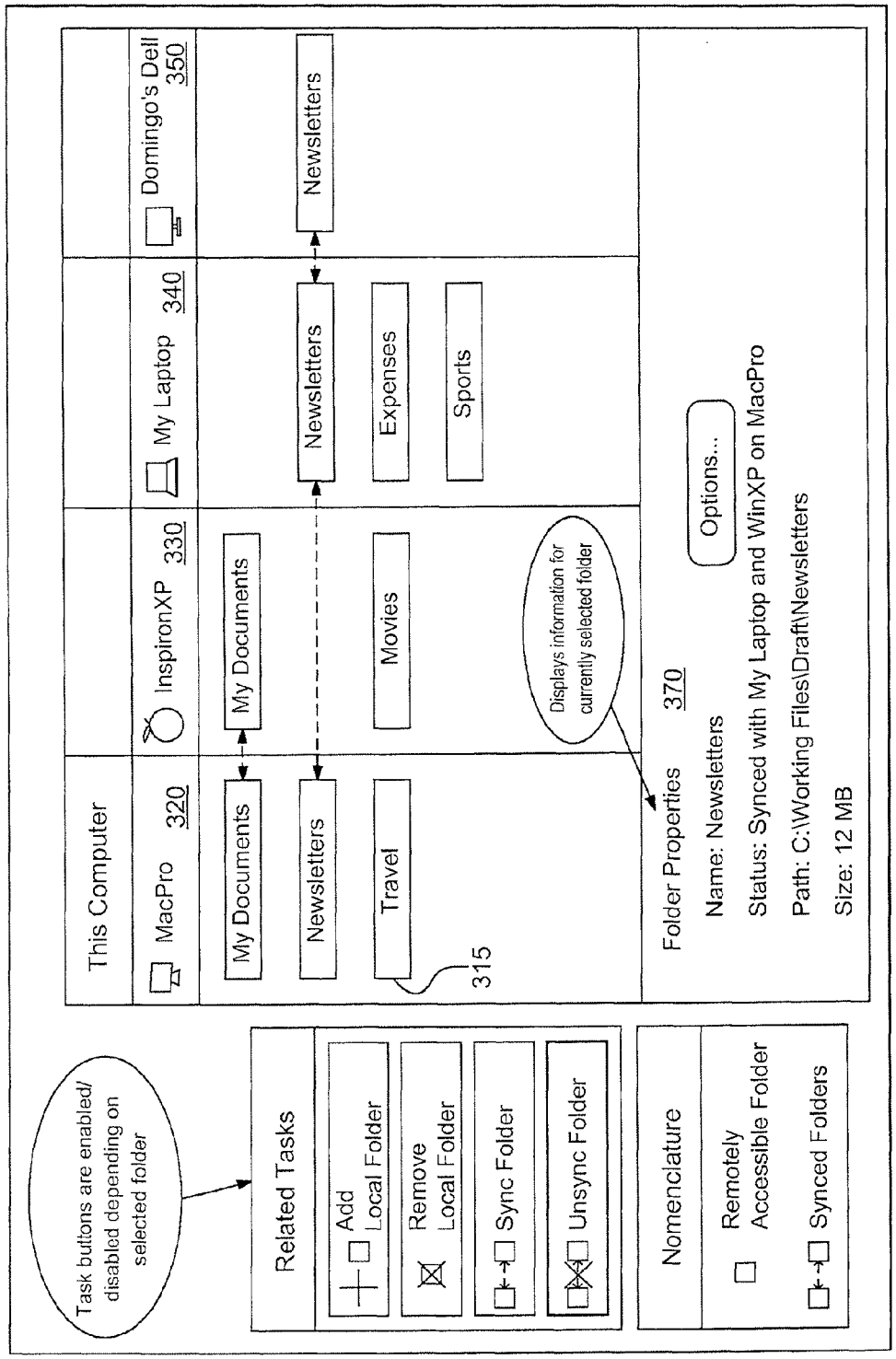
FIGS. 3, 4, 5, 6a-6e are screen shots that illustrate examples of a user interface for displaying settings for a user's account in a synchronization system.

An example of a user interface generated by the client UI application in accordance with the present invention is illustrated in FIG. 3, with reference to FIG. 2. FIG. 2 illustrates an example scenario in which a user has associated electronic devices 220-250 with this user's account in a synchronization system 200. The system 200 includes a central synchronization server 210 to which items can be backed up. The synchronization server also can facilitate the synchronization of items among the electronic devices 220-250. In this example, the user has named the electronic devices 220-250 associated with his account "MacPro" (220), "InspironXP" (230), "My Laptop" (240), and "Domingo Dell" (250). Each of the devices 220-250 has a client UI application that provides a user interface in accordance with the method of FIG. 1.

In FIG. 3, the "MacPro" is identified as "This Computer" (i.e., the local computer), and, thus, this interface is generated by the client UI application on the MacPro computer 220. Each of user devices 220-250 is associated with its own column 320-350, respectively. In one embodiment of the invention, the local computer (in this case MacPro computer 220) is always assigned to a particular column. In this example (as well as the example of FIG. 4), the local computer is always associated with the left-most column.

Each column 320-350 has a visual representation of the folders that have been added to the user's account on each of devices 220-250. For example, column 320 illustrates that the user has added folders titled "My Documents," "Newsletters," "and "Travel" on the MacPro computer 220 to the user's account, and column 330 illustrates that the user has added folders titled "My Documents" and "Movies" on the InspironXP 230 to the user's account.

The arrows between visual representations of the "My Document" folders in columns 320 and 330 indicate that these folders are synchronized between the MacPro 220 and InspironXP 230. Similarly, the arrows between the visual representations of the "Newsletters" folders in columns 320, 330, and 350 indicate that these folders are synchronized across MacPro 220, My Laptop 240, and Domingo's Dell 250.

The folders that are not synchronized across multiple user devices do not have any arrows connecting them to any other folders. In this example, visual representations of such folders in a column indicate such folders are backed up by the synchronizations system and/or available for remote access through the synchronization. For example, the visual representation 315 of the "Travel" folder on the MacPro 220 indicates that the "Travel" folder is backed up and/or available for remote access in the synchronizations system. A folder that is back-up on the central synchronization server 210 is synchronized with the central synchronization server 210.

Figure 4:
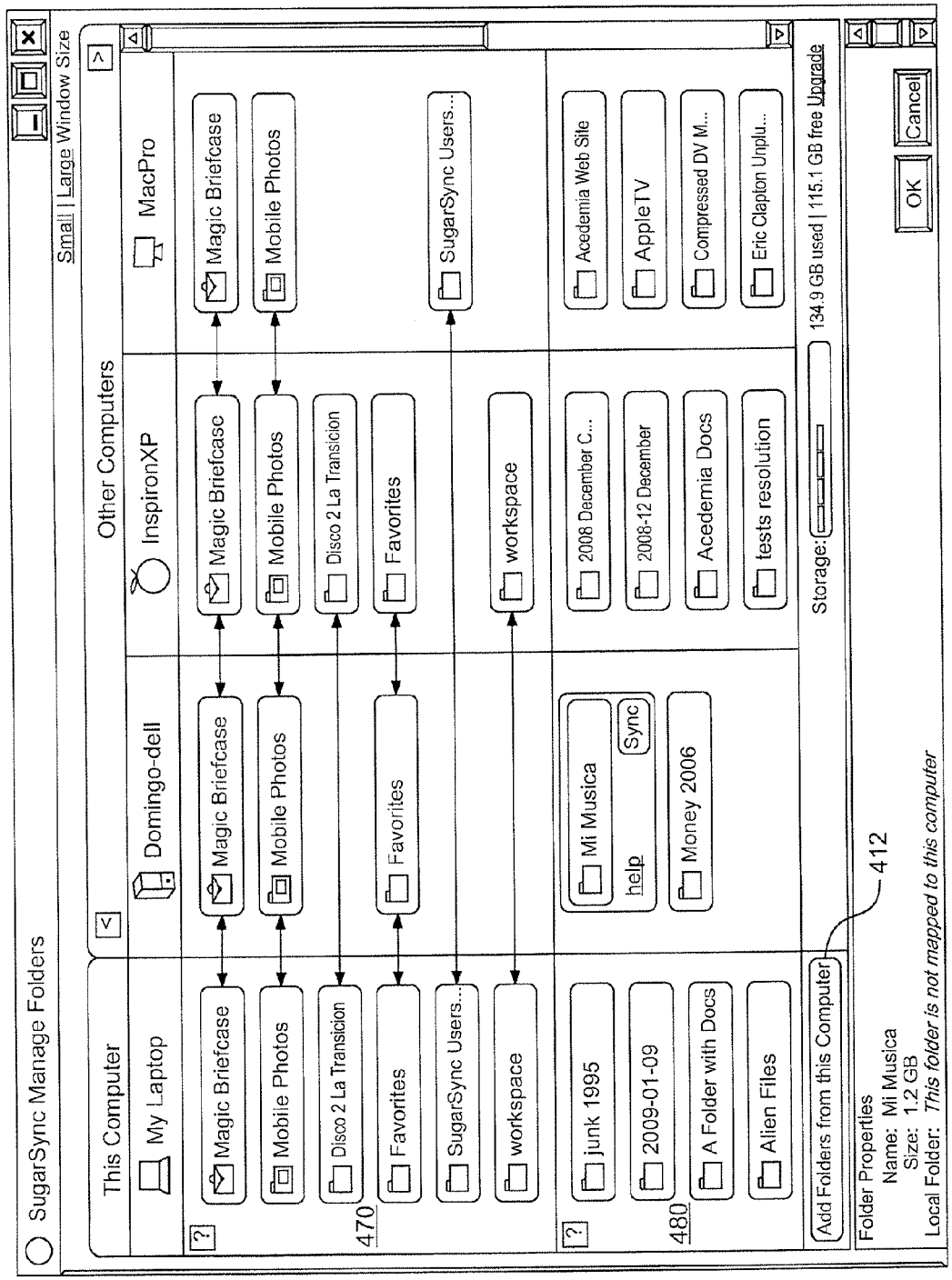

FIG. 4 illustrate another example of a user interface generated by a client UI application in accordance with the method of FIG. 1. Like the example in FIG. 3, each of the user's devices is associated with a column in the user interface. However, in addition, the user interface is divided horizontally into two sections 470 and 480. In the top section 470, the client UI application illustrates folders that are synchronized across two or more client devices. In the bottom section 480, the client application illustrates folders that are backed up and/or available for remote access or sharing, but not synchronized across multiple devices.

In one embodiment, the user interface generated by the client UI application includes a section that displays information related to a folder selected in the interface. In FIG. 3, "Folder Properties" section 370 displays the name, status, directory path, and size of the currently-selected folder.

Figure 5:
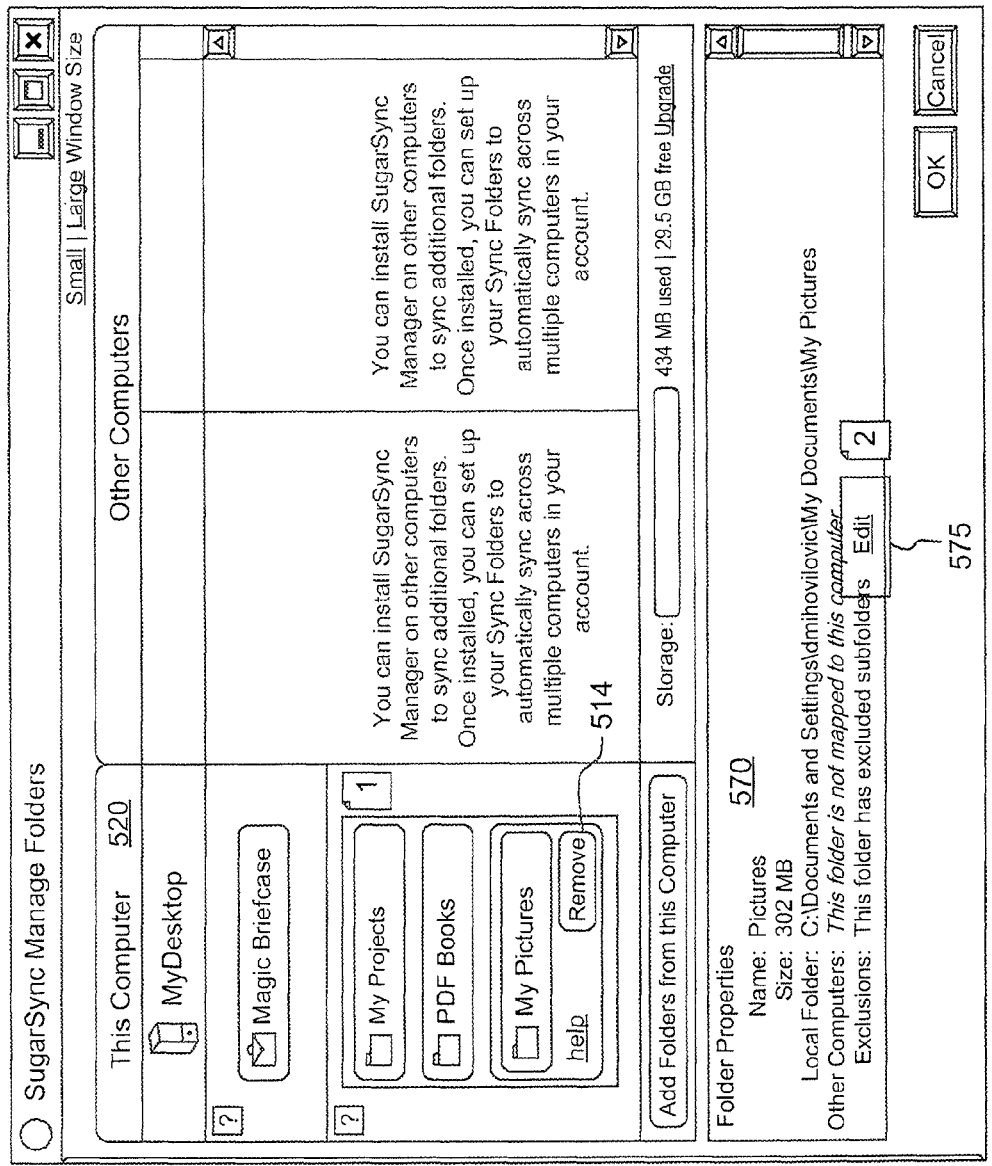

In one embodiment, the client UI application enables the user to add or remove folders (or, if applicable, other items) from the local device on which the client application is running. For example, in FIG. 4, button 412 enables the user to add folders from the user device "My Laptop" to the user's account. As another example, FIG. 5 illustrates a "remove" button 514 that appears when a user selects a folder in the column associated with the local device.

When a user adds a folder to his account, the user has the option of excluding subfolders from the folder. FIG. 5 illustrates an example of this. In the Folder Properties section 570, a user can select the "edit" link 575 to identify the folders he wants to exclude from a folder. In this embodiment, the edit link 575 appears in the Folder Property section 570 when the user selects a folder in the "This Computer" column 520.

The client UI application also enables the user to synchronize folder from a remote device to the local device on which the UI application is running. A folder on a remote device is referred to herein as a "remote folder." FIGS. 6 and 7 illustrate an example dialog flow in the user interface when a user synchronizes a remote folder to the local device on which the client UI application is running.

When the user selects a remote folder (or, more specifically, a visual representation of the remote folder) in the user interface, the client application displays a sync option, such as sync button 616 illustrated in FIG. 6 (step 710). If the user chooses the sync option, the user is prompted to pick a destination for the selected folder on the local device (see, for example, the dialog box in FIG. 6*b*) (step 720). The user can choose a new folder or an existing folder on the local device.

If the user chooses a new folder on the local device, all the components of the selected remote folder will be copied to the new folder on the local device (step 730). Thereafter, the two folders will be automatically kept in sync. The new folder is added the column associated with the local device (740). If the user chooses an existing folder on the local device, the contents of such existing folder and the selected remote folder will be merged, and, thereafter, automatically kept in sync (step 750). The existing folder is added to the column associated with the local device (step 760).

Figure 6A:
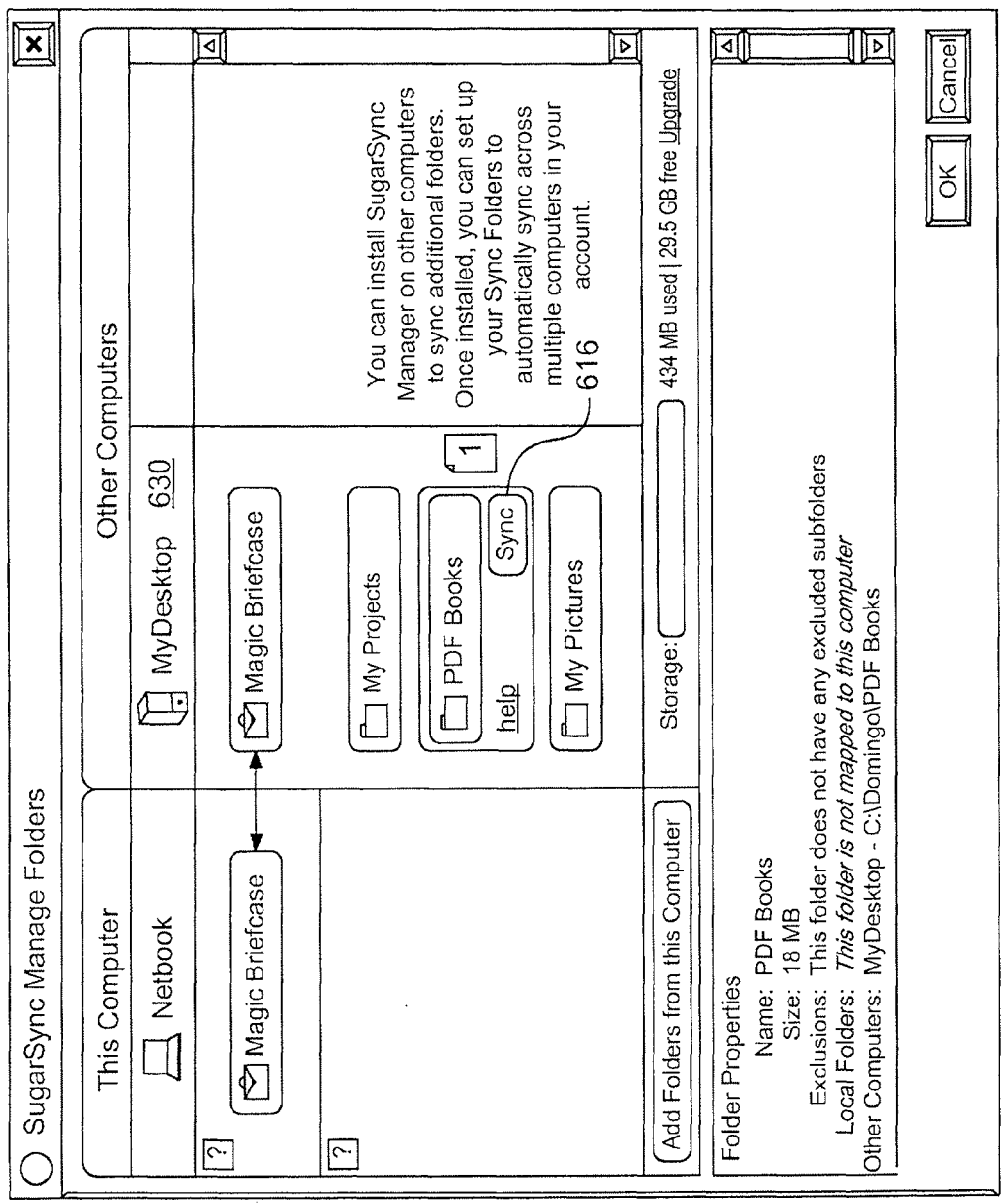
Figure 6B:
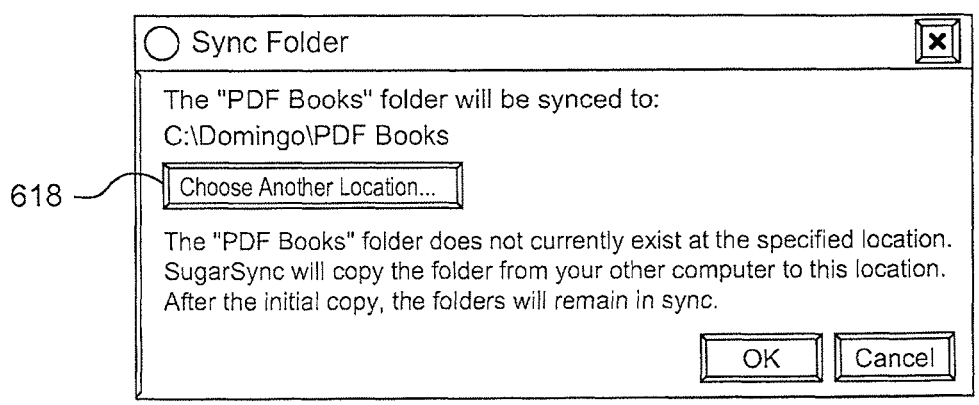
Figure 6C:
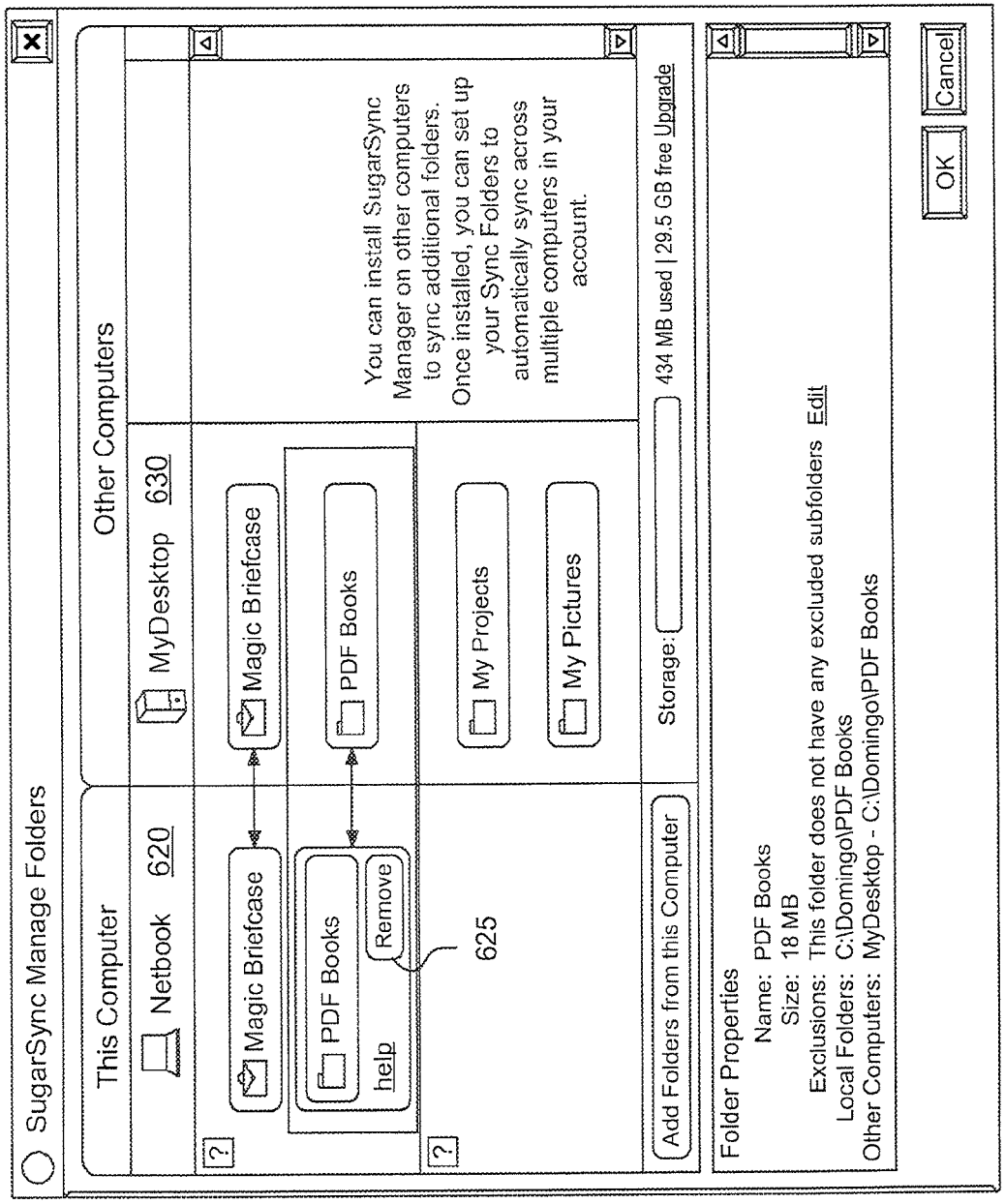
Figure 7:
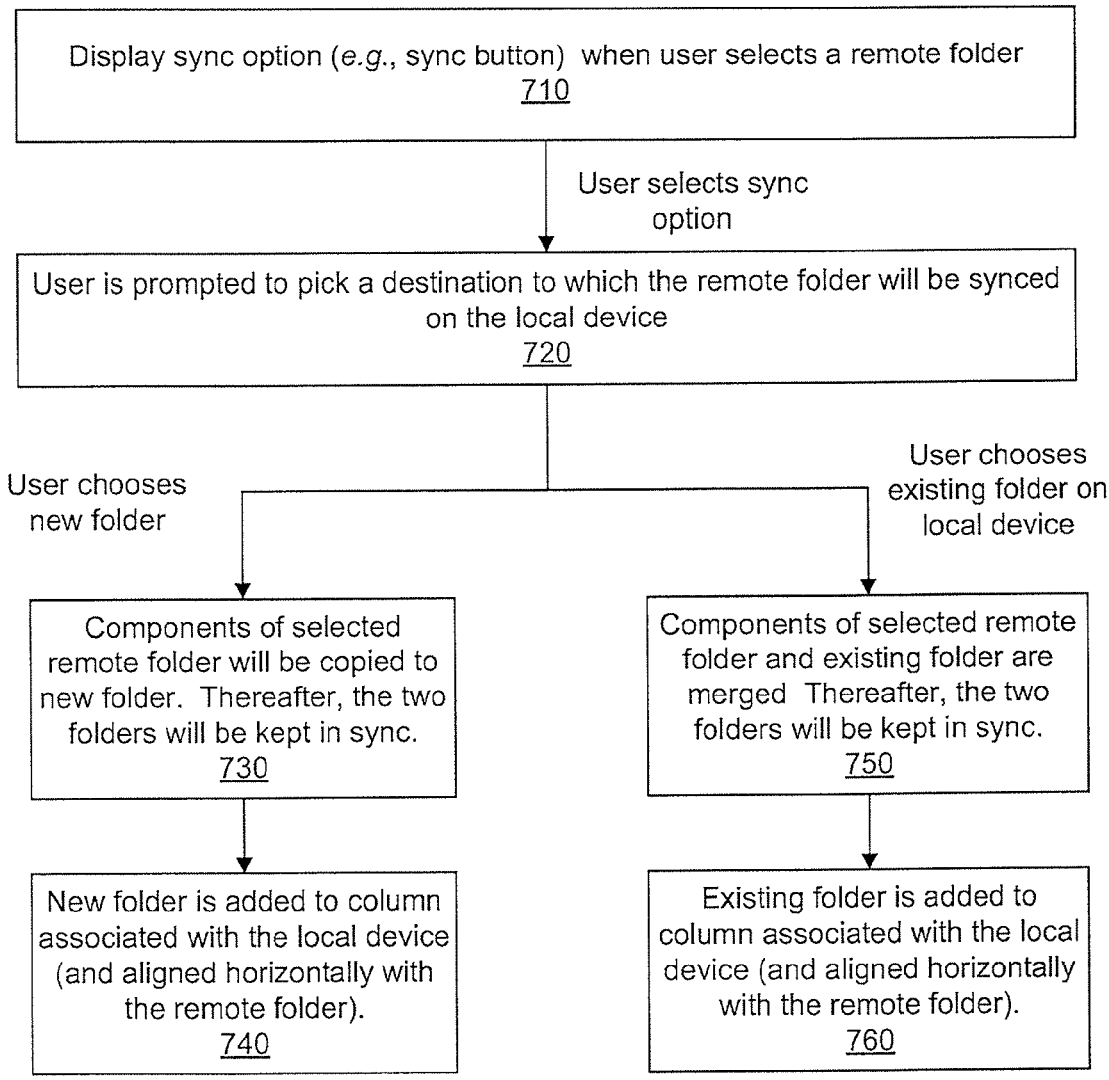
FIG. 7 is a flowchart, according to one embodiment of the invention, that illustrates a dialog flow when the user synchronizes a remote folder to a local device.

In FIG. 6a, the user has selected the remote folder "PDF Books" in the "My Desktop" column 630 and sync button 616 is displayed. When the user clicks on the Sync button 616, the dialog box in FIG. 6b appears. In this case, the default destination shown in the dialog box is a new folder "PDF Books" on the "Netbook" device (the local device), but the user can select button 618 to choose another destination (i.e., another folder on the Netbook device). The user clicks "OK" to select the default destination, and the folder "PDF books" appears in column 620, as shown in FIG. 6c. The arrow between the folders "PDF Books" in columns 620 and 630 indicates these folders are synced. A user can stop syncing the PDF Books folder to the "Netbook" device by selecting the folder "PDF Books" in column 620 and clicking on the "Remove" button 625.

Figure 6D:
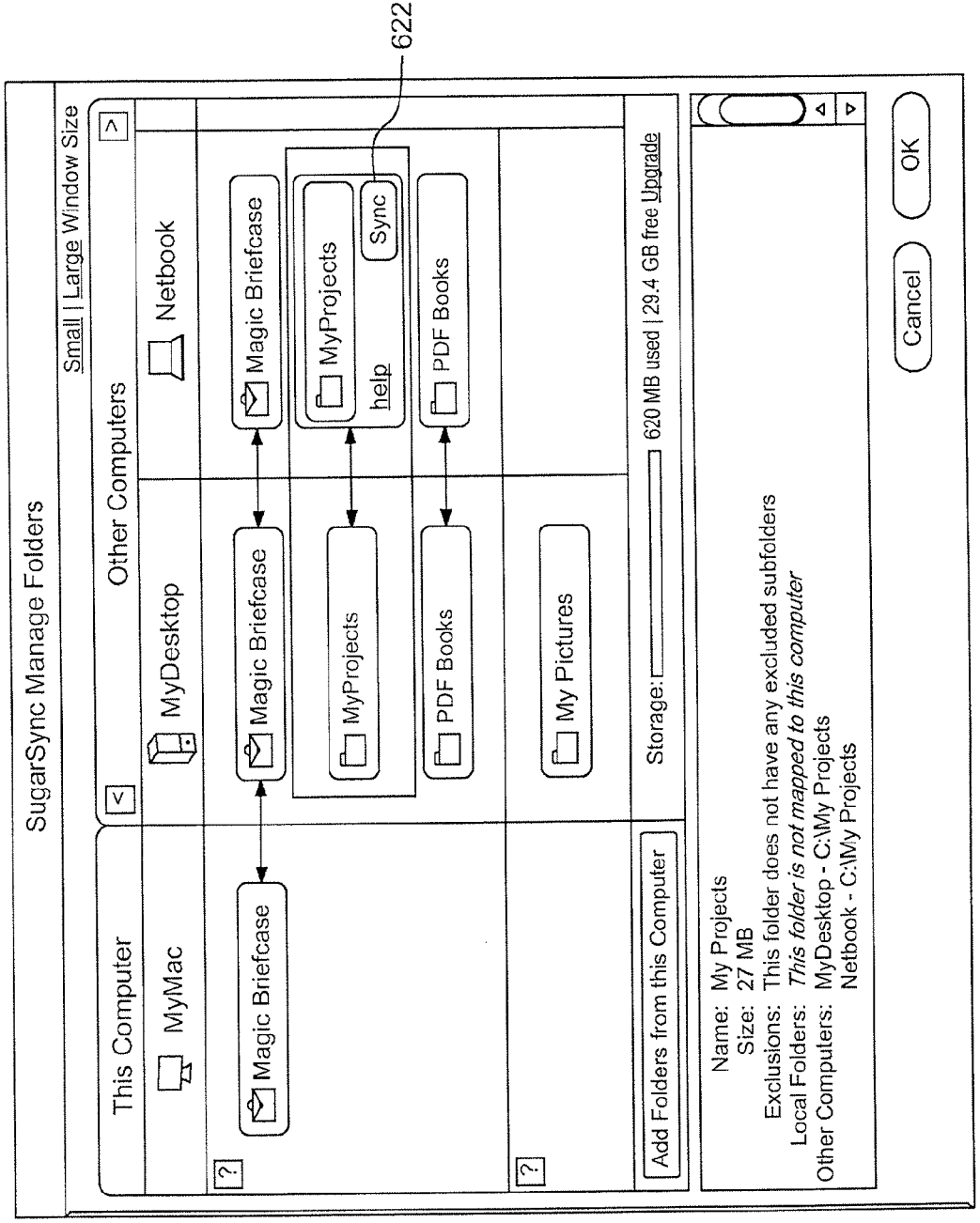
Figure 6E:
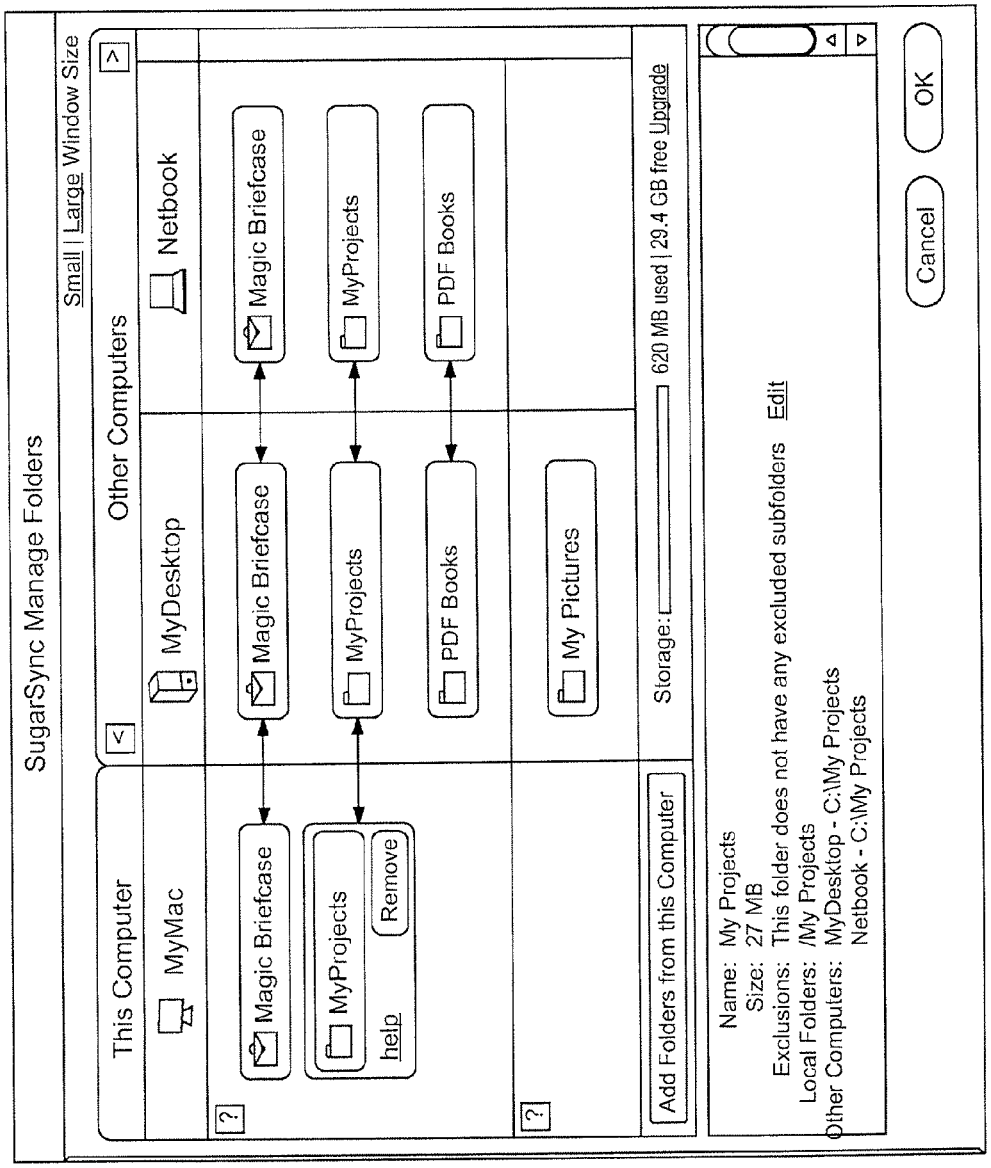

FIGS. 6d and 6e illustrate a continuation of the foregoing scenario. In this case the user has added the device "MyMac" to the user's account and is using the client UI application on the "MyMac" device. In FIG. 6d, the user interface illustrates that the folders "My Project" are synced between the user devices "MyDesktop" and "Netbook." By selecting the "My Projects" folder in either the "MyDesktop" column or the "Netbook" column and then click the sync button (e.g., button 622), the user also can sync this folder to the local computer "MyMac." FIG. 6e illustrates the resulting user interface after the user has done this.

In the embodiment described with respect to FIG. 3-7, the user can only add or remove local folders. In other words, to add a folder from a device to his account, the user must do so with the Client UI application on the device on which the folder resides. In an alternate embodiment of the invention, the user is able to remotely add and remove folders from his account through the user interface.

Figure 8:
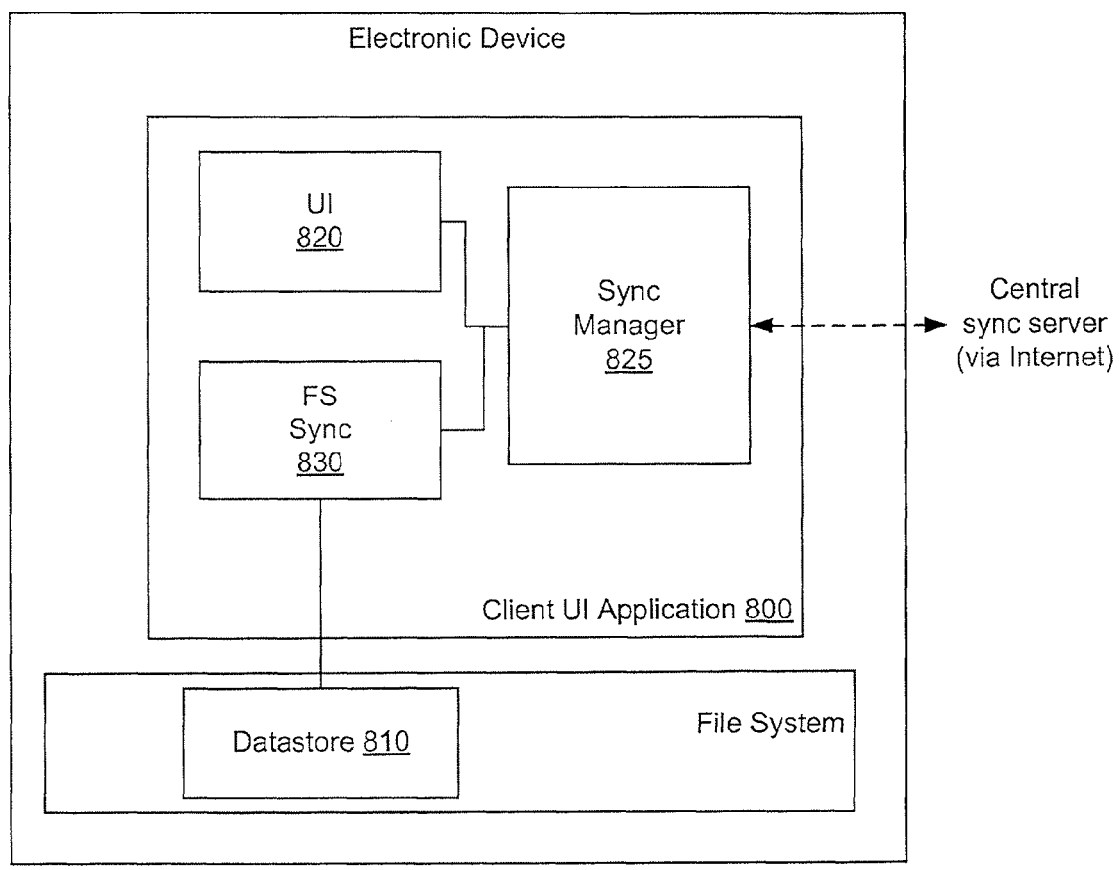
FIG. 8 is a block diagram of an example software architecture of a client UI application according to one embodiment of the invention.

FIG. 8 illustrates one embodiment of a software architecture for the client UI application 800. The architecture illustrated in FIG. 8 is an example and not intended to be limiting of the invention.

Referring to FIG. 8, the client UI application 800 includes a File System Sync Module 830 which monitors a Datastore 810 on an electronic device for changes. The Datastore 810 includes the items that the user has added to his account in the synchronization system (e.g., the folders the user is backing up or synchronizing). When the electronic device is online the Sync Manager 825 maintains a dedicated connection with a sync server in the synchronization system (such as central synchronization server 210 in FIG. 2). The Sync Manager 825 notifies the sync server of any changes to the Datastore 810. Also, the Sync Manager 825 receives notice of changes on the user's other electronic devices if such changes are relevant to the local client device (e.g., the changes are to a remote folder that is synchronized with a folder on the local client device.). In accordance with the methods described herein, the UI module 820 generates a user interface through which a user can view and manage settings in his account in the synchronization system. The Sync Manager 825 provides the UI module 820 with the information about the user's account that the UI module 820 displays in the user interface (e.g., the electronic devices associated with the user's account, the items added to the user's account, etc.). When a user makes a change to his account through the user interface, the UI module 820 notices the Sync Manager 825 so that the Sync Manager 825 can notify the central sync server and the File System Sync module 830 as necessary.

The methods for generating a user interface described herein are not limited to client UI applications on the user's electronic devices. The central synchronization server may also have a UI application that generates a user interface that a user can access through a web browser. Such server UI application can generate a user interface in accordance with FIG. 1 and the other features described herein.

Systems and methods for backing up data, synchronizing data, sharing data, and/or providing remote access to data are described in detail in the below-listed patent application, all of which are incorporated by reference herein as if fully disclosed herein:

1. U.S. patent application Ser. No. 12/157,772, titled "Method and Apparatus for File Sharing and Synchronization System," and filed on Jun. 13, 2008.

2. U.S. patent application Ser. No. 11/636,458, titled "Efficient Synchronization of Changes to Images," and filed on Dec. 8, 2006.

3. U.S. patent application Ser. No. 12/383,387, titled "Opportunistic Peer-to-Peer Synchronization in a Synchronization System," and filed on Mar. 24, 2009.

4. U.S. patent application Ser. No. 12/383,693, titled "System and Method for Multi-Tier Synchronization," and filed on Mar. 26, 2009.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method on an electronic device for displaying settings for a user's account in a synchronization system, the method comprising:
providing a user interface on the electronic device that displays:
a column for each electronic device associated with the user's account in the synchronization system; and
a visual representation of each item added to the user's account, wherein each visual representation of an item is placed in the column associated with the electronic device on which the item is located, wherein visual representations of items that are synchronized with each other across a plurality of the electronic devices are aligned horizontally in the user interface with each column being divided horizontally into a first section for displaying visual representations of items synchronized across a plurality of the electronic devices and a second section for displaying visual representations of items that are not synchronized across a plurality of the electronic devices.

2. The method of claim 1, wherein an arrow is displayed between the visual representations of two items that are synchronized with each other.

3. The method of claim 1, wherein a line is placed between the visual representations of two items that are synchronized with each other.

4. The method of claim 1, wherein an icon is placed between the visual representations of two items that are synchronized with each other.

5. The method of claim 1, wherein the user interface displays indicators of functions that enable a user to add a local item to the user's account, delete a local item from the user's account, and sync an item.

6. The method of claim 5, wherein an item is a folder comprising at least one file.

7. The method of claim 6, wherein, the user interface displays an indicator of a function that enables a user to exclude subfolders from a folder added to the user's account.

8. A method on an electronic device for displaying settings for a user's account in a synchronization system, the method comprising:
   providing a user interface on the electronic device that displays;
   a row for each electronic device associated with the user's account in the synchronization system; and
   a visual representation of each item added to the user's account, wherein each visual representation of an item is placed in the row associated with the electronic device on which the item is located, wherein visual representations of items that are synchronized with each other across a plurality of the electronic devices are aligned horizontally in the user interface with each column being divided horizontally into a first section for displaying visual representations of items synchronized across a plurality of the electronic devices and a second section for displaying visual representations of items that are not synchronized across a plurality of the electronic devices.

9. A computer program embodied on a non-transitory processor-readable medium and comprising code, that, when executed by an electronic computing device, enables the electronic computing device to perform the following method:
   providing a user interface on the electronic computing device that displays:
      a column for each electronic computing device associated with the user's account in the synchronization system; and
      a visual representation of each item added to the user's account, wherein each visual representation of an item is placed in the column associated with the electronic computing device on which the item is located, wherein visual representations of items that are synchronized with each other across a plurality of the electronic devices are aligned horizontally in the user interface with each column being divided horizontally into a first section for displaying visual representations of items synchronized across a plurality of the electronic devices and a second section for displaying visual representations of items that are not synchronized across a plurality of the electronic devices.

10. The computer program of claim 9, wherein an arrow is displayed between the visual representations of two items that are synchronized with each other.

11. The computer program of claim 9, wherein a line is placed between the visual representations of two items that are synchronized with each other.

12. The computer program of claim 9, wherein an icon is placed between the visual representations of two items that are synchronized with each other.

13. The computer program of claim 9, wherein the user interface displays indicators of functions that enable a user to add a local item to the user's account, delete a local item from the user's account, and sync an item.

14. The computer program of claim 13, wherein an item is a folder comprising at least one file.

15. The computer program of claim 14, wherein, the user interface displays an indicator of a function that enables a user to exclude subfolders from a folder added to the user's account.

* * * * *